United States Patent
Sugawara et al.

(10) Patent No.: US 6,194,094 B1
(45) Date of Patent: *Feb. 27, 2001

(54) POLYMER ELECTROLYTE FUEL CELL

(75) Inventors: Yasushi Sugawara, Neyagawa; Makoto Uchida, Hirakata; Hideo Ohara, Kadoma; Yuko Fukuoka, Kyoto; Nobuo Eda, Hirakata, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,605

(22) Filed: Nov. 4, 1998

(30) Foreign Application Priority Data

Nov. 7, 1997 (JP) .................................................. 9-305425

(51) Int. Cl.$^7$ ...................................................... H01M 8/00
(52) U.S. Cl. ................................ 429/13; 429/14; 429/17; 429/19; 429/34; 429/40; 429/41; 429/42; 429/44; 429/50; 429/51
(58) Field of Search ................................. 429/40, 41, 42, 429/44, 13, 17, 19, 14, 34, 50, 51

(56) References Cited

U.S. PATENT DOCUMENTS

| 5,474,857 | * | 12/1995 | Uchida et al. | 429/42 |
| 5,501,915 | * | 3/1996 | Hards et al. | 429/44 |
| 5,861,222 | * | 1/1999 | Fischer et al. | 429/41 |

FOREIGN PATENT DOCUMENTS

| 6295728 | 10/1994 | (JP) . |
| 7134993 | 5/1995 | (JP) . |

* cited by examiner

*Primary Examiner*—Bruce F. Bell
(74) *Attorney, Agent, or Firm*—Steven, Davis, Miller & Mosher, L.L.P.

(57) ABSTRACT

A gas diffusion layer including an electroconductive porous material and 16–55% by weight of fluororesin added to the electroconductive porous material is used for at least one of the positive electrode and the negative electrode of a membrane/electrodes assembly of a polymer electrolyte fuel cell. As a result, the water-retaining property of the inside of the membrane/electrodes assembly is improved without hindering gas diffusion, thus enabling polymer electrolyte to be moistened with water formed at the positive electrode, and thereby providing a polymer electrolyte fuel cell which operates by using unhumidified gas.

6 Claims, 6 Drawing Sheets

IMPREGNATION METHOD

Pt-CARRYING CARBON POWDER
+ WATER REPELLING - TREATED
CARBON POWDER
(DRY MIXING)

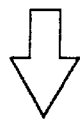

SCATTERING ON WATER
REPELLING - TREATED
CARBON PAPER

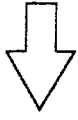

HOT PRESSING

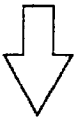

SUCTION COATING OF
ISOPROPANOL SOLUTION
OF POLYMER ELECTROLYTE (b)

DROPWISE ADDITION METHOD

Pt-CARRYING CARBON POWDER
+ WATER REPELLING - TREATED
CARBON POWDER
(DRY MIXING)

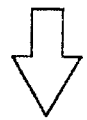

DISPERSING IN ORGANIC SOLVENT

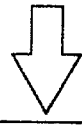

DROPWISE ADDITION OF
ALCOHOLIC SOLUTION OF
POLYMER ELECTROLYTE

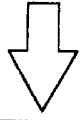

ULTRASONIC TREATMENT

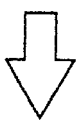

COATING ON WATER REPELLING
- TREATED CARBON PAPER

POLYMER ELECTROLYTE FUEL CELL

BACKGROUND OF THE INVENTION

1. Field of the Invention

The present invention relates to a polymer electrolyte fuel cell (hereinafter abbreviated as PEFC) which uses as the fuel a reducing agent such as pure hydrogen or modified hydrogen obtained from methanol or fossil fuels and uses as the reaction gas such an oxidizing agent such as air or oxygen. In more particular, the invention relates to a PEFC which operates by unhumidified reaction gas.

2. Description of Related Art

A PEFC comprises a membrane/electrode assembly consisting essentially of a polymer electrolyte membrane and gas diffusion electrodes (hereinafter referred to as MEA), in which, as shown in FIG. 1, reactions represented by the formulas (1) and (2) take place respectively at the positive electrode 4 and the negative electrode 5.

$$\tfrac{1}{2}O_2 + 2H^+ + 2e^- \rightarrow H_2O \qquad (1)$$

$$H_2 \rightarrow 2H^+ + 2e^- \qquad (2)$$

When the above reactions take place, the protons generated at the negative electrode move to the positive electrode via the polymer electrolyte membrane 1. Since a polymer electrolyte does not show a high ionic conductivity unless it is in a sufficiently moistened condition, generally the reaction gas needs to be always humidified by the use of a humidifier or the like in order to prevent the electrolyte from drying. On the other hand, the gas diffusion layer 2 of the electrode needs to have a high gas permeability in order that a high current density can be obtained. Therefore, to prevent the blockage of the gas diffusion path, excessive moisture must be discharged to the outside of the MEA. For example, JP-A-6-295728 uses as the gas diffusion layer carbon paper formed essentially of carbon fiber made from polyacrylonitrile as the raw material and subjected to a water repellent treatment using fluoro-resin. In JP-A-7-134993, the diffusion layer of the fuel electrode is provided with a hydrophobicity gradient such that the hydrophobicity is increasingly low toward the catalyst layer side 3 and the diffusion layer of the positive electrode is provided with a hydrophobicity gradient such that the hydrophobicity is increasingly high toward the catalyst layer side. By adopting the above-mentioned structure, the lowering of the moisture content of the polymer electrolyte of the fuel electrode side is prevented and the so-called flooding, which is a phenomenon wherein the catalyst layer is wetted by water formed at the positive electrode side and results in the blockage of the gas diffusion path.

However, when the previous PEFC which operates by humidified gas, which is so designed as to discharge excessive water to the outside of the MEA, is operated by using an unhumidified gas, the polymer electrolyte membrane and the polymer electrolyte contained in the catalyst layer become dry and the movement of protons tends to take place with difficulty. Moreover, the polymer electrolyte in the catalyst layer undergoes contraction to decrease the area of the electrolyte covering the platinum catalyst, that is, the reaction area, resulting in the increase of the internal resistance of the PEFC; thus, a good characteristic property cannot be obtained. In the operation of a PEFC using unhumidified gas, on the other hand, the flooding caused by the water formed at the positive electrode hardly takes place unlike in the operation thereof using humidified gas, so that it is important to retain the water formed at the positive electrode inside the MEA without discharging the water to its outside. In a PEFC of the structure specified by JP-A-7-134993, also, when the cell is operated by using an unhumidified gas, the amount of water evaporated from the positive electrode is large and hence the internal resistance increases similarly.

SUMMARY OF THE INVENTION

According to the present invention, the water-retaining property of the inside of the MEA is improved without hindering gas diffusion, whereby the polymer electrolyte can be sufficiently moistened by use of the water formed at the positive electrode and resultantly the operation of a PEFC using an unhumidified gas becomes possible. Thus, the object of the present invention is to provide a PEFC which can be operated by use of an unhumidified gas.

To attain the above-mentioned object, according to the present invention, in a PEFC which operates by unhumidified air or oxygen and unhumidified hydrogen or reformed gas containing hydrogen, a gas diffusion layer comprising an electroconductive porous material and 16–55% by weight of fluororesin added thereto is used for at least one of the positive and the negative electrodes, whereby the water-retaining property of the inside of the MEA can be improved without hindering gas diffusion and resultantly the polymer electrolyte can be moistened with the water formed at the positive electrode.

According to the present invention, an excellent water-retaining property of the inside of the MEA is attained without hindering gas diffusion and hence the polymer electrolyte can be sufficiently moistened with the water formed at the positive electrode, whereby a PEFC which can be operated by using an unhumidified gas can be provided.

BRIEF DESCRIPTION OF THE SEVERAL VIEWS OF THE DRAWINGS

FIG. 2(a) is a diagram showing a process for preparing a gas diffusion layer using the impregnation method, and FIG. 2(b) is a diagram showing a process for preparing a gas diffusion layer using the dropwise addition method.

DETAILED DESCRIPTION OF THE INVENTION

Figure 1:
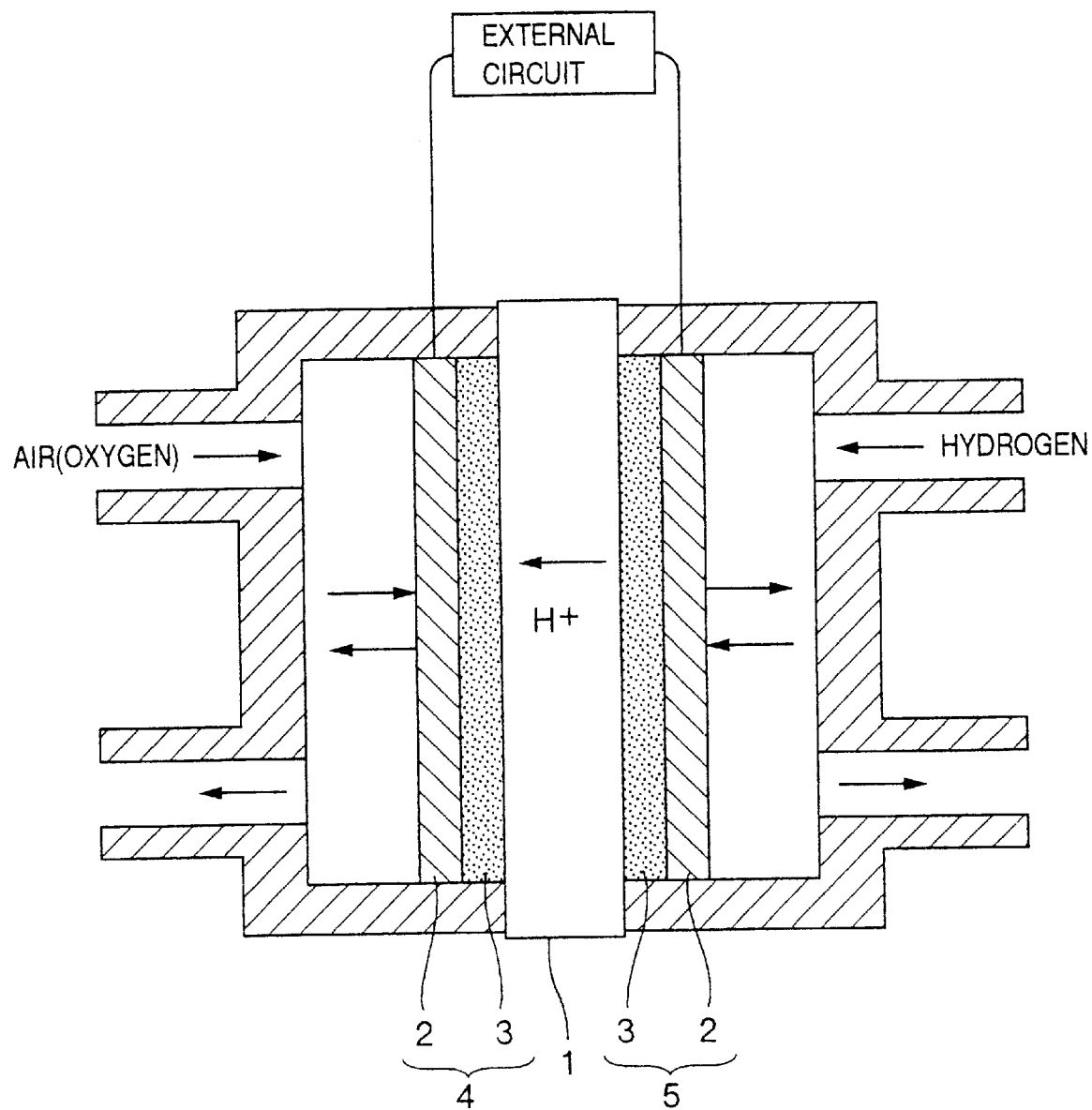
FIG. 1 is a schematic representation of a polymer electrolyte fuel cell.

The object of the present invention is to provide a polymer electrolyte fuel cell which comprises a polymer electrolyte membrane and, arranged on the both sides thereof, a positive electrode and a negative electrode, the positive electrode and the negative electrode each comprising a catalyst layer and a gas diffusion layer, and which is operated by feeding unhumidified air or oxygen to the positive electrode and feeding unhumidified hydrogen or reformed gas containing hydrogen to the negative electrode wherein the gas diffusion layer of at least one of the positive electrode and the negative electrode comprises an electroconductive porous material and 16–55% by weight of fluororesin added thereto. According to the invention, the diffusion of gas is not hindered and the inside of the MEA can attain an excellent water-retaining property, so that a PEFC can be provided wherein the polymer electrolyte can be sufficiently moistened with the water formed at the positive electrode and which can be operated by use of unhumidified gases.

When the percentage of the fluororesin added (sometimes referred to as "fluororesin addition percentage") is small the water repellency of the gas diffusion layer is low, so that the water formed and condensed in the catalyst layer of the positive electrode is apt to pass through the gas diffusion layer and be discharged to the outside of the MEA with ease. Consequently, the MEA becomes dry and the moisture content of the polymer electrolyte becomes low, resulting in a high internal resistance and a low voltage.

On the other hand, when the percentage of the fluororesin added is large, the water repellency of the gas diffusion layer is high and its porosity is low, so that the gas diffusion layer acts just like a cover for the MEA, and liquified water is apt to pass through the gas diffusion layer with difficulty. However, since the gas permeability becomes low at the same time, the diffusion of the reaction gas becomes rate-determining and resultantly the voltage becomes low.

Thus, in a high performance PEFC which operates by unhumidified gas, it is important to keep a good balance between the water repellency of the diffusion layer and the gas permeability of the layer. To enhance the water repellency of the gas diffusion layer without hindering gas diffusion and thereby to enhance the water-retaining property of the inside of the MEA, the addition of 16–55% by weight, more preferably 40–50% by weight, of fluororesin to the layer is effective.

The fluororesin addition percentage of the gas diffusion layer is calculated by the formula (3).

$$U_F = \frac{W_{S+F} - W_S}{W_{S+F}} \quad (3)$$

$U_F$(wt %): Fluororesin addition percentage of gas diffusion layer $W_F$(kg) : Weight of porous electroconductive material $W_{S+F}$(kg): Weight of porous electoconductive material after water repelling treatment (porous electroconductive material + fluororesin)

When the porosity of the gas diffusion layer subjected to water-repelling treatment is 45–75% by volume, a good effect is obtained in enhancing the water repellency of the gas diffusion layer without hindering gas diffusion and thereby enhancing the water-retaining property of the inside of the MEA, and a high performance PEFC can be provided. The porosity is more preferably 50–70% by volume.

When the specific volume of pores having a diameter of 17–90 μm in the gas diffusion layer subjected to water-repelling treatment is 0.45–1.25 cc/g, a good effect is obtained in enhancing the water repellency of the gas diffusion layer without hindering gas diffusion and thereby enhancing the water-retaining property of the inside of the MEA, and a high performance PEFC can be provided. The specific volume of pores having a diameter of 17–90 μm is more preferably 0.55–0.80 cc/g.

When copolymer of tetrafluoroethylene with hexafluoropropylene is used as the fluororesin, a higher performance PEFC can be provided.

Further, when carbon paper comprising carbon fiber made from polyacrylonitrile as the raw material is used as the electroconductive porous material, a higher performance PEFC can be provided.

For at least one of the positive and the negative electrodes in the PEFC of the present invention, preferably an electrode is used which is prepared by the dropwise addition method comprising the step of dispersing carbon powder supporting a noble metal catalyst in an organic solvent to obtain a liquid dispersion, the step of mixing the liquid dispersion with an alcoholic solution of a polymer electrolyte to form a polymer electrolyte colloid and obtain at the same time a liquid mixture wherein the colloid is adsorbed to the carbon powder and the step of applying the liquid mixture on one side of the above-mentioned diffusion layer.

Another example of the dropwise addition method comprises the step of preparing a colloid dispersion by mixing an organic solvent and an alcoholic solution of a solid polymer electrolyte to produce colloid, the step of preparing a liquid mixture by mixing the colloid dispersion and noble metal catalyst-supporting carbon powder to adsorb the colloid to the carbon powder and the step of applying the liquid mixture on one side of the above-mentioned diffusion layer. Among these dropwise addition methods, the former is preferable.

A difference in the method of preparing a gas diffusion electrode leads to a difference in the state of dispersion of the polymer electrolyte in the catalyst layer, which affects the characteristic property of the PEFC. In order further to enhance the effect of fluororesin addition percentage of the present invention, the above-mentioned dropwise addition method is preferred. According to the dropwise addition method, the polymer electrolyte is adsorbed to the platinum-supporting carbon powder thinly and in a highly dispersed state, so that the network of the polymer electrolyte in the catalyst layer grows reticulately all over the layer. In the operation of a PEFC using an unhumidified gas, such a state of the catalyst layer acts to return the generated water staying in the catalyst layer to the polymer electrolyte membrane with good efficiency; thus a PEFC with a higher performance can be provided.

The present invention may also be a sub-combination of these described features.

PEFCs obtained according to some embodiments of the present invention are described below.

Embodiment 1

An MEA is prepared as follows according to the method for preparing a gas diffusion electrode shown in FIG. 2(a) (hereinafter referred to as the impregnation method).

Carbon powder carrying a platinum catalyst is mixed with carbon fine powder which has been water repelling-treated by addition of polytetrafluoroethylene (hereinafter abbreviated as PTFE). The resulting powder mixture for catalyst is scattered on one side of carbon paper comprising carbon fiber made from polyacrylonitrile as the raw material to which 16–55% by weight of tetrafluoroethylene-hexafluoropropylene copolymer (hereinafter referred to as FEP) has been melt-bonded beforehand, and the resulting system is hot-pressed at 340–380° C. and 5–20 kgf/cm$^2$ to obtain a gas diffusion electrode.

The addition of the polymer electrolyte to the as diffusion electrode is conducted by using a method which comprises coating a solution mixture of isopropyl alcohol and a Nafion solution of a proportion of 0.05–1.5 g of the latter per 2 ml of the former on the electrode while suctioning the electrode from the carbon paper side by means of a pump, followed by drying.

A polymer electrolyte membrane is held between two gas diffusion electrodes prepared as described above and the resulting system is hot-pressed by using a hot press at 120–170° C. and 50 kgf/cm$^2$. The MEA obtained through the above-mentioned steps does not hinder gas diffusion and is excellent in the water-retaining property of its inside. Thus, a PEFC can be provided in which the polymer electrolyte can be moistened with the water formed at the positive electrode and which can be operated by use of unhumidified gases.

Embodiment 2

An MEA is prepared as follows according to the method for preparing a gas diffusion electrode shown in FIG. 2(b) (hereinafter referred to as the dropwise addition method).

First, carbon powder supporting a platinum catalyst is mixed with carbon fine powder which has been water repelling-treated by addition of PTFE. The resulting powder mixture for catalyst is mixed with n-butyl acetate to obtain a liquid dispersion of platinum catalyst. To the liquid dispersion is added in drops, with stirring by means of a magnetic stirrer, an alcoholic solution of a polymer electrolyte, and then the resulting mixture is made into the form of paste by use of an ultrasonic disperser. The paste thus obtained is coated on one side of carbon paper comprising carbon fiber made from polyacrylonitrile as the raw material to which 16–55% by weight of FEP has been melt-bonded beforehand, and then dried to obtain a gas diffusion electrode. A polymer electrolyte membrane is held between two gas diffusion electrodes thus obtained and the whole is hot-pressed by using a hot press at 120–170° C. and 50 kgf/cm$^2$.

The MEA obtained through the above-mentioned steps does not hinder gas diffusion. Furthermore, since the polymer electrolyte is adsorbed into the catalyst layer more thinly and in a more highly dispersed state than in the PEFC shown in Embodiment 1, this PEFC is more excellent in the water-retaining property of the inside of the MEA. Consequently, a PEFC can be provided in which the polymer electrolyte can be moistened with the water formed at the positive electrode more efficiently and which can be operated by use of unhumidified gases.

The present invention is described in detail below with reference to Examples. The examples are not intended to limit the scope of the invention.

EXAMPLE 1

By using FEP as the fluororesin, gas diffusion layers in which the FEP addition amount is 8–60% by weight were prepared.

Each of the gas diffusion layers was prepared by immersing a carbon paper (mfd. by Toray Industries, Ltd.), used as the carbon paper comprising carbon fiber made from polyacrylonitrile as the raw material, in a FEP liquid dispersion obtained by diluting a FEP (ND-1, a Trade name, mfd. by Daikin Industries, Ltd.) with deionized water and then baking the resulting paper to melt-bond the FEP to the carbon paper. Gas diffusion layers A–F having a FEP addition amount ranging from 8 to 60% by weight as shown in Table 1 were prepared by controlling the degree of dilution of ND-1.

TABLE 1

|  | FEP addition amount (wt %) |
| --- | --- |
| Gas diffusion layer A | 8 |
| B | 16 |
| C | 40 |
| D | 50 |
| E | 55 |
| F | 60 |

Figure 3:
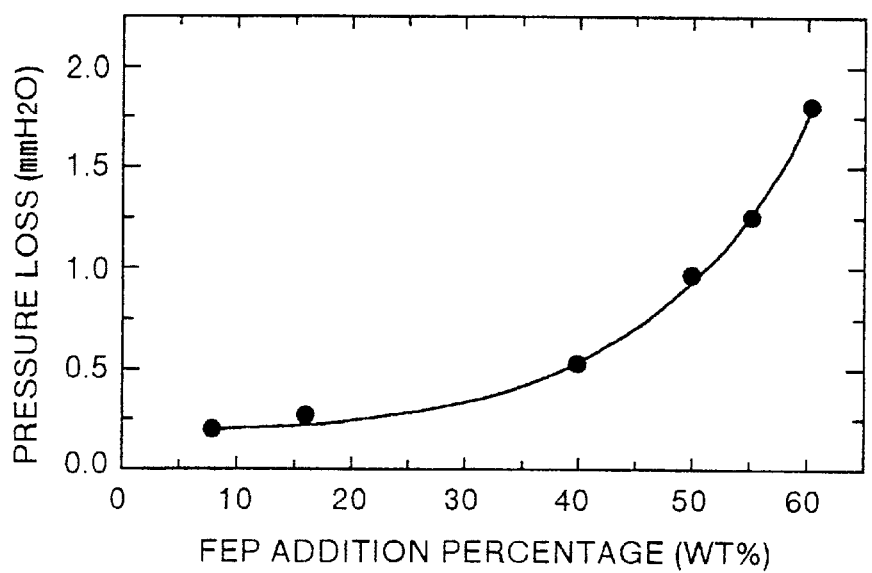
FIG. 3 is a graph showing the relation between the FEP addition percentage (i.e., percentage of FEP added) and the pressure loss of the gas diffusion layer.

The gas diffusion layers A–F prepared above were determined for their pressure loss. FIG. 3 shows the relation between the FEP addition percentage and the pressure loss of the gas diffusion layer. The results obtained reveal that the pressure loss of the gas diffusion layer increases as the FEP addition percentage increases.

Then the gas diffusion layers A–F were determined for their porosity and pore size distribution by the mercury intrusion method.

Figure 4:
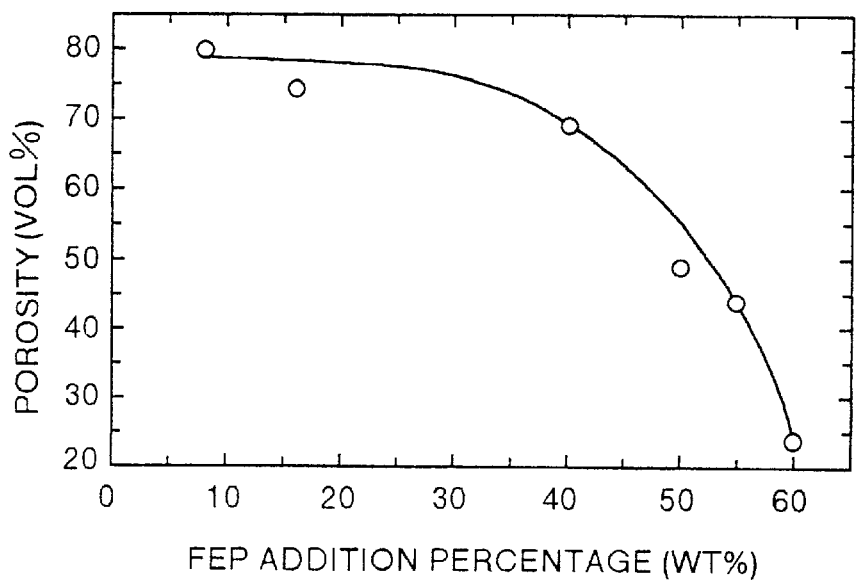
FIG. 4 is a graph showing the relation between the FEP addition percentage and the porosity of the gas diffusion layer.

FIG. 4 shows the relation between the FEP addition amount and the porosity of the gas diffusion layer. The results obtained show that the porosity decreases as the FEP addition percentage increases, revealing that the pores are filled with FEP.

Figure 5:
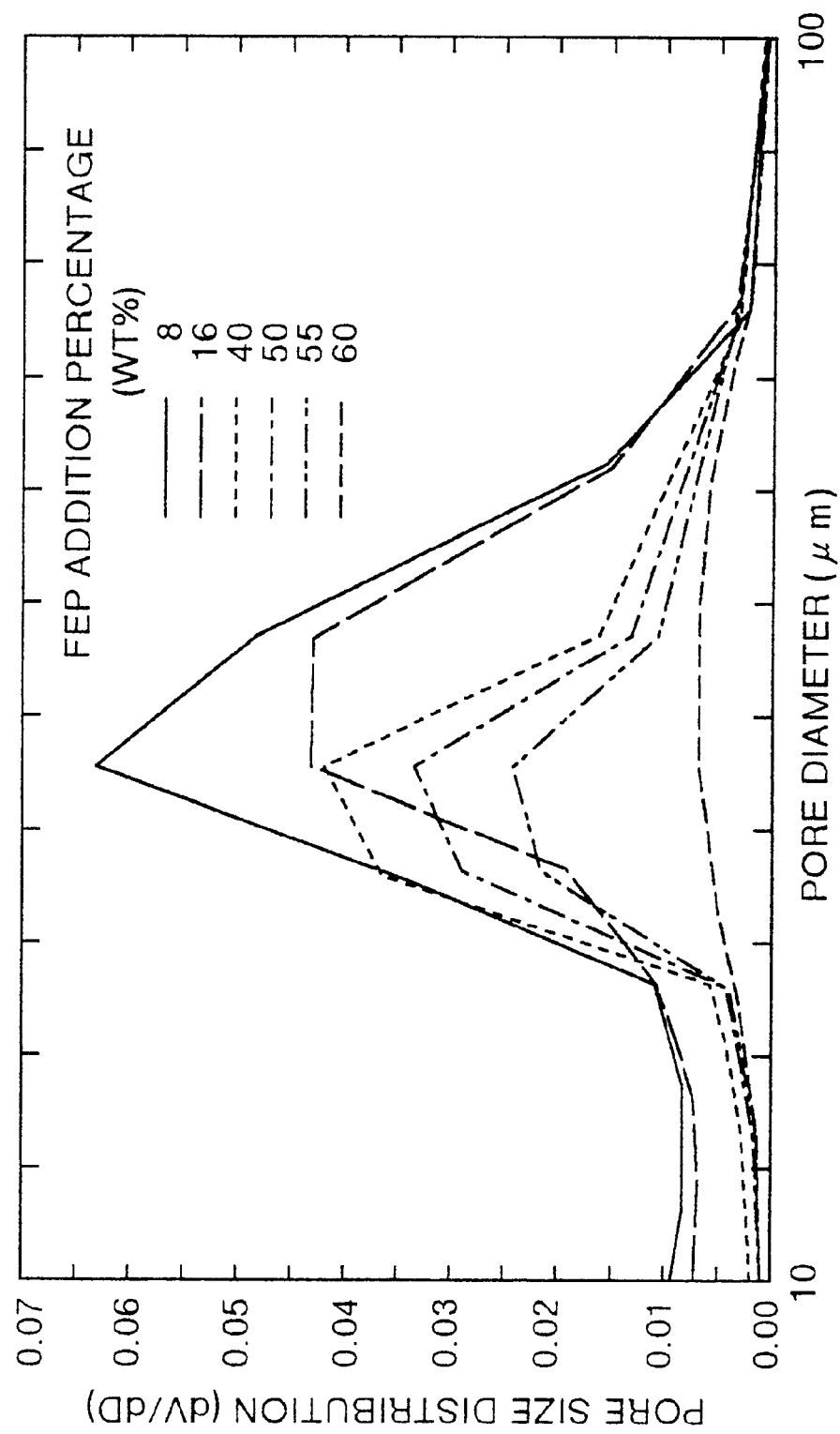
FIG. 5 is a graph showing the pore size distribution of the gas diffusion layer at the respective FEP addition percentages.

FIG. 5 shows the pore size distribution of each of the gas diffusion layers A–F. Each of the curves shows a large peak in the diameter range of 17–90 $\mu$m. The peak area, and hence the specific pore volume, decreases with the increase of the FEP addition percentage. The results obtained above reveal that, in the carbon paper used, the pores are predominantly in the range of diameter of 17–90 $\mu$m and the FEP is distributed among and in the pores of these diameters.

Table 2 summarizes with the gas diffusion layers A–F, the FEP addition percentages, the porosities and the specific volumes of pores having a diameter of 17–90 $\mu$m.

TABLE 2

| Gas diffusion layer | A | B | C | D | E | F |
| --- | --- | --- | --- | --- | --- | --- |
| FEP addition percentage (wt %) | 8 | 16 | 40 | 50 | 55 | 60 |
| Porosity (vol %) | 80 | 75 | 70 | 50 | 45 | 25 |
| Specific volume of pores having pore diameter of 17–90 $\mu$m (cc/g) | 1.38 | 1.25 | 0.80 | 0.55 | 0.45 | 0.30 |

EXAMPLE 2

PEFCs were prepared as follows by using the gas diffusion layers A–F prepared in Example 1 and according to the impregnation method shown in FIG. 2(a).

Carbon powder supporting 10–30% by weight of platinum catalyst and carbon fine powder which has been water repelling-treated by addition of 25–70% by weight of PTFE were mixed in a mixing ratio ranging from 8:2 to 5:5. Each of the resulting powder mixtures for catalyst layer was scattered on one side of the gas diffusion layer having the FEP addition percentage of 8–60% by weight obtained in Example 1, and the resulting system was hot-pressed at 340–380° C. and 5–20 kgf/cm$^2$.

The addition of the polymer electrolyte to the electrode was conducted by a method which comprises coating a solution mixture of isopropyl alcohol and a "5% Nafion solution" (a trade name, mfd. by Aldrich Chemical Co., Ltd., USA) of a proportion of 0.05–1.5 g of the latter per 2 ml of the former on the electrode while suctioning the electrode from the carbon paper side by means of a pump, followed by drying. Then Nafion 112 (a polymer electrolyte membrane mfd. by Du Pont de Nemours, E.I., Co., USA) was held between two electrodes prepared as above and the resulting system was hot-pressed by using a hot press at 120–170° C. and 50 kgf/cm$^2$. The amounts of platinum and polymer electrolyte added were respectively 0.5 mg/cm$^2$ and 1.0 mg/cm$^2$ per apparent electrode area for both of the electrodes. PEFCs were constructed by using the MEAs prepared above and designated as cells A–F.

EXAMPLE 3

PEFCs were prepared as follows by using the gas diffusion layers A–F obtained in Example 1 and according to the dropwise addition method shown in FIG. 2(b).

Carbon powder supporting 10–30% by weight of platinum catalyst and carbon fine powder which has been water repelling-treated by addition of 25–70% by weight of PTFE were mixed in a mixing ratio ranging from 8:2 to 5:5. The resulting powder mixture for catalyst layer was mixed with n-butyl acetate so as to give a weight ratio of platinum to n-butyl acetate of 1 to 120, to obtain a liquid dispersion of the platinum catalyst. To the liquid dispersion was added in drops, with stirring by means of a magnetic stirrer, an alcoholic solution of a polymer electrolyte until the amount ratio of platinum to polymer electrolyte reached 1:2, and the resulting mixture was made into the form of paste by using an ultrasonic disperser. The alcoholic solution of polymer electrolyte used was "5% Nafion solution" (a trade name, mfd. by Aldrich Chemical Co., Ltd., USA). The paste obtained above was coated on one side of the gas diffusion layer having a FEP addition percentage of 8–60% by weight obtained in Example 1 and then dried to obtain a gas diffusion electrode. A polymer electrolyte membrane, Nafion 112 (a trade name, mfd. by Du Pont de Nemours, E.I., Co., USA), was held between two electrodes obtained as described above and the resulting system was hot-pressed by using a hot press at 120–170° C. and 50 kgf/cm$^2$. The amounts of platinum and polymer electrolyte added were respectively 0.5 mg/cm$^2$ and 1.0 mg/cm$^2$ per apparent electrode area for both of the electrodes. PEFCs were constructed by using the MEAs prepared above and designated as cells a–f.

The cells A–F prepared by the impregnation method in Example 2 and the cells a–f prepared by the dropwise addition method in Example 3 were each subjected to constant-current discharge at 0.2 A/cm$^2$ by feeding hydrogen gas to the negative electrode and air to the positive electrode both in the unhumidified state.

Figure 6:
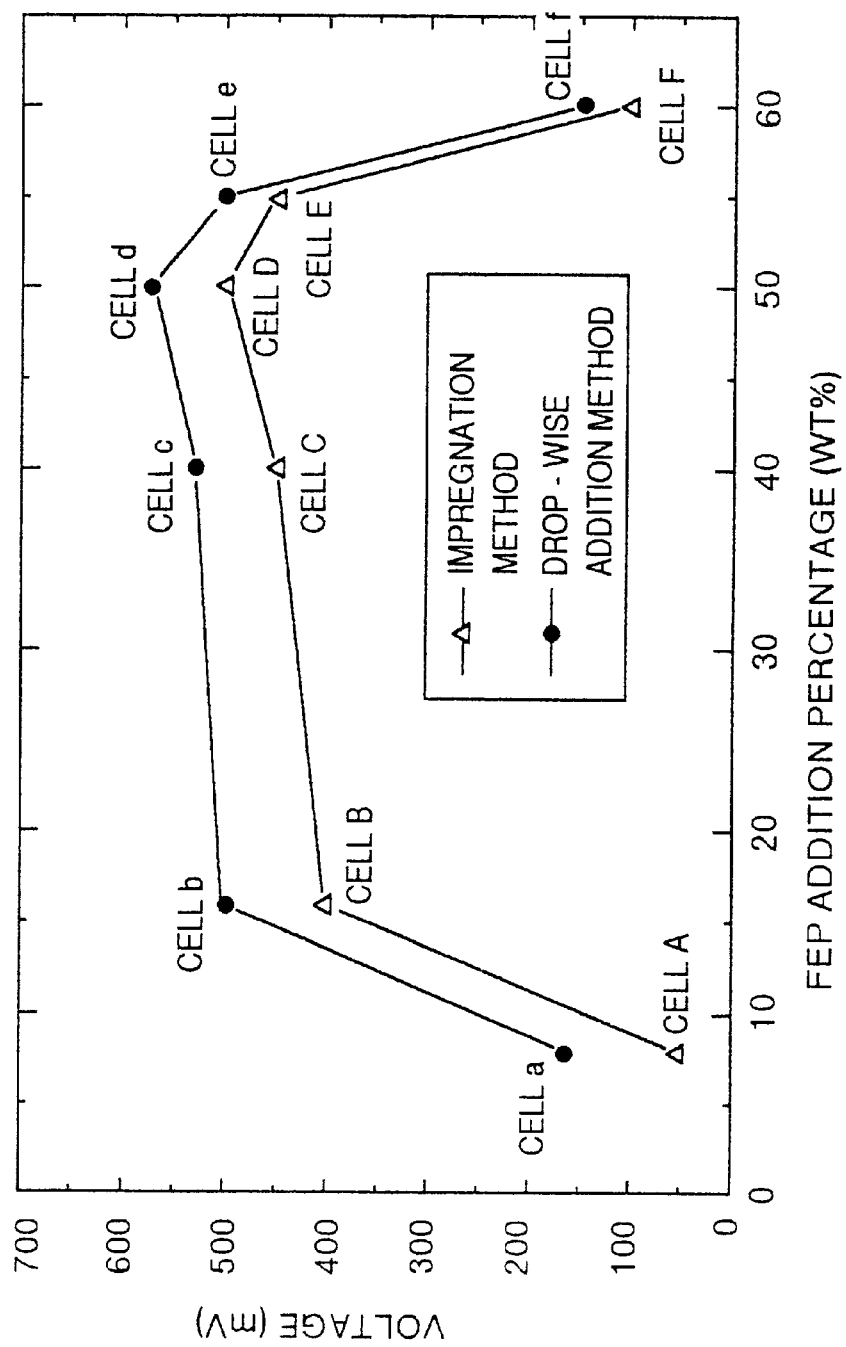
FIG. 6 is a graph showing the relation between the percentage of FEP added to the gas diffusion layer and the voltage of the cell at 0.2 A/cm².

FIG. 6 shows the relations between the percentage of FEP added to the gas diffusion layer and the voltages of cells A–F and cells a–f at a current value of 0.2 A/cm$^2$. In the cells A–F prepared by the impregnation method in Example 2, the voltage was 0.4 V or higher when the FEP addition percentage was 16–55% by weight, a high voltage being exhibited particularly at 40–50% by weight; when the FEP addition percentage was 8% by weight and 60% by weight, the cell voltage was very low, as low as 100 mV or lower. In the cells a–f prepared by the dropwise addition method in Example 3, the voltage was 0.5 V or higher when the FEP addition percentage was 16–55% by weight, a high voltage being exhibited particularly at 40–50% by weight; when the FEP addition percentage was 8% by weight and 60% by weight, the cell voltage was very low, as low as 150 mV. In the cells prepared by both the impregnation method and the dropwise addition method, the cell voltage showed similar behavior against the FEP addition percentage, but the cells prepared by the dropwise addition method showed 50–100 mV higher voltages at respective FEP addition percentages as compared with those by the impregnation method.

Figure 7:
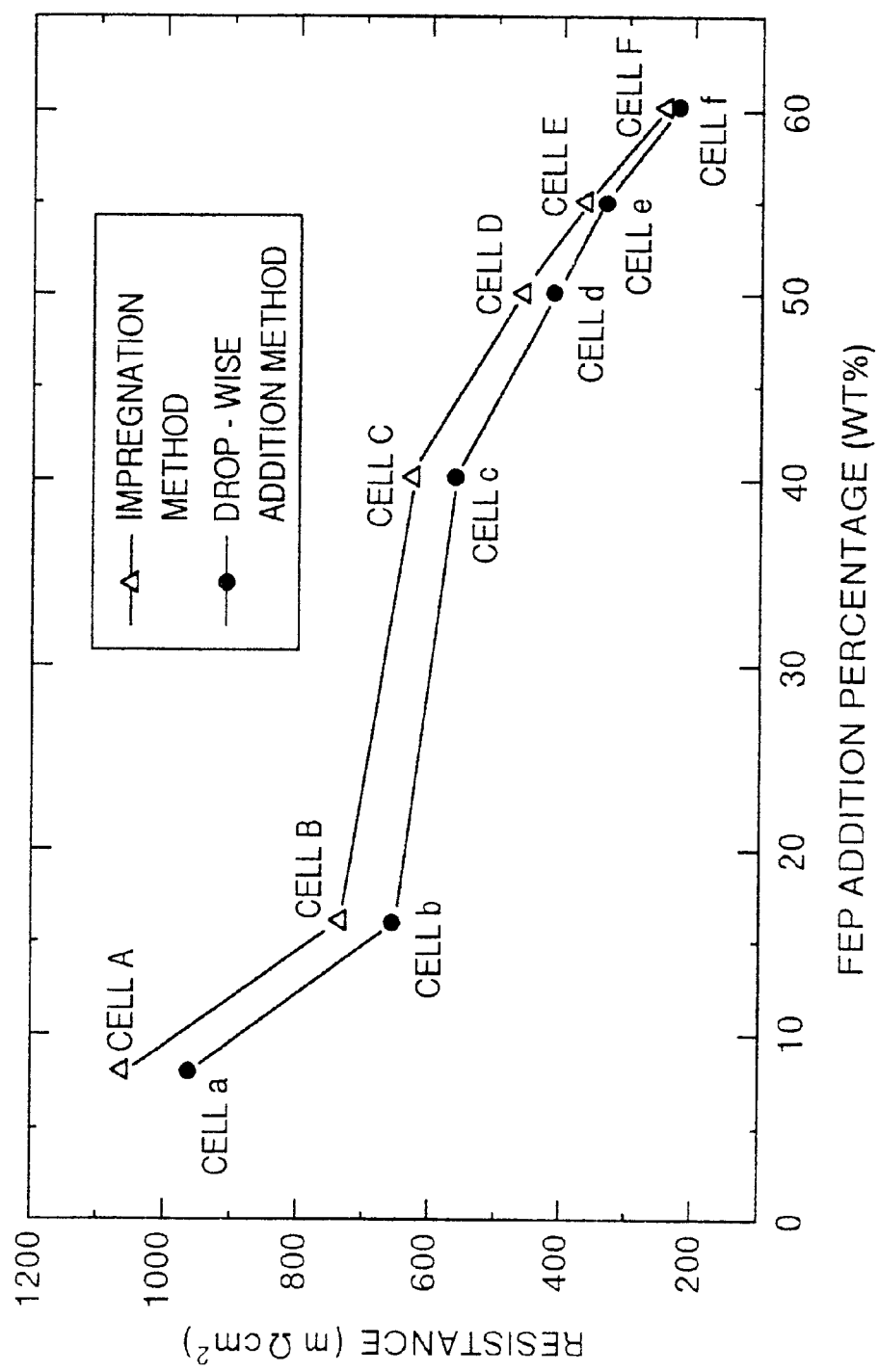
FIG. 7 is a graph showing the relation between the percentage of FEP added to the gas diffusion layer and the resistance of the cell at 0.2 A/cm².

FIG. 7 shows the relation between the percentage of FEP added to the gas diffusion layer and the internal resistance of the cell. In both of the cells prepared by the impregnation method and the dropwise addition method, the internal resistance of the cell decreased with the increase of the FEP addition percentage. The decrease of the resistance was particularly large when the FEP addition percentage increased from 8% by weight to 16% by weight. The internal resistance of the cells prepared by the impregnation method was higher than that of the cells prepared by the dropwise addition method over the whole range of FEP addition percentage.

Since the pressure loss increases when the FEP addition percentage increases as described above, it is considered that when the addition percentage increases, the gas permeability of the gas diffusion layer tends to decrease, in other words the gas tends to diffuse with difficulty. The increase of the pressure loss is conceivably due to the decrease of porosity, that is, due to filling of FEP in the pores of the gas diffusion layer. Furthermore, since the pores of the gas diffusion layer are predominantly of a diameter of 17–90 μm and the specific volume of the pores having a diameter of 17–90 μm is observed to decrease when the FEP addition percentage increases, it is considered that gases are supplied through the pores of the above-mentioned diameters and FEP is filled in the pores of said diameters.

In the gas diffusion layer having a FEP addition percentage of 8% by weight, the water repellency is low due to the low FEP addition percentage, so that the water formed and condensed in the catalyst layer of the positive electrode passes through the gas diffusion layer and is discharged to the outside of the MEA with ease. It is considered that consequently the MEA becomes dry and the moisture content of the polymer electrolyte decreases to lower the ionic conductivity and increase the internal resistance of the PEFC. This increase of the internal resistance is considered as the cause of the lowering of voltage.

On the other hand, the gas diffusion layer having a FEP addition percentage of 60% by weight has a high water repellency and low porosity, so that the layer acts just like a cover for the MEA and the liquified water passes through the gas diffusion layer only with difficulty. Thus, the water formed in the catalyst layer of the positive electrode and condensed is discharged with difficulty to the outside of the MEA. It is considered that, consequently the water can be supplied via the polymer electrolyte in the positive electrode catalyst layer to the polymer electrolyte membrane and the polymer electrolyte in the fuel electrode catalyst layer and thus the MEA has a high water-retaining ability. It is considered that since the moisture content of the polymer electrolyte increases resultantly and the ionic conductivity increases, the internal resistance of the PEFC decreased when the FEP addition percentage was high. However, since the gas permeability is too low when the percentage of FEP is high, the voltage decrease bacause of rate-determining by the diffusion of reaction gas.

It is therefore considered that in the cells using a gas diffusion layer having a FEP addition percentage of 16–55% by weight, high voltages were exhibited because the supply of the reaction gas and humidification by the water formed were sufficient.

Differences in the characteristic properties of gas diffusion electrodes obtained by different methods of preparation is conceivably attributed to the state of dispersion of the polymer electrolyte in the catalyst layer thereof. In the cells prepared by the dropwise addition method, as compared with cells prepared by the impregnation method, the polymer electrolyte is adsorbed to the platinum-supporting carbon powder more thinly and in a more highly dispersed state, so that the network of polymer electrolyte of the catalyst layer is well developed. It is considered that, in the operation of PEFC by unhumidified gas, such a state of the catalyst layer serves for returning the generated water staying in the catalyst layer to the polymer electrolyte membrane with good efficiency.

From the foregoing, a good balance between the water repellency of the diffusion layer and the gas permeability thereof is important for preparing a high performance PEFC which operates by unhumidified gas. Enhancing the water repellency of the gas diffusion layer without hindering gas diffusion and enhancing the water-retaining property of the inside of the MEA are effectively attained when the FEP addition percentage is 16–55% by weight, or when the porosity of the gas diffusion layer subjected to water repelling treatment is 45–75% by volume or when the specific volume of pores having a diameter of 17–90 μm of the gas diffusion layer subjected to water repelling treatment is 0.45–1.25 cc/g; the effect is particularly marked when the FEP addition percentage is 40–50% by weight, or when the porosity of the gas diffusion layer subjected to water repelling treatment is 50–70% by volume or when the specific volume of pores having a diameter of 17–90 μm in the gas diffusion layer subjected to water repelling treatment is 0.55–0.80 cc/g. When additionally the gas diffusion electrode is prepared by the dropwise addition method, a PEFC can be provided wherein the polymer electrolyte in the catalyst layer is adsorbed thinly and in a highly dispersed state and which exhibits more enhanced performance in the operation by unhumidified gas.

Though FEP was used as the fluororesin in the present Examples, similar effects may also be obtained by using other fluororesins having water repellency, e.g., polytetrafluoroethylene, tetrafluoroethylene-perfluoroalkyl vinyl ether copolymer and tetrafluoroethyleneethylene copolymer.

Though gas diffusion electrodes were prepared in the present Examples by preparing a paste comprising a platinum catalyst, polymer electrolyte and organic solvent and coating the paste on a carbon paper subjected to water repelling treatment, followed by drying, the present invention can be applied to the whole of the gas diffusion electrodes which comprise at least a noble metal catalyst and a polymer electrolyte irrespective of the method of preparation of the electrodes.

In the present Examples, carbon paper comprising carbon fiber made from polyacrylonitrile as the raw material was used as the electroconductive porous material, but the present invention can be applied to porous conductive materials in general, e.g., carbon cloth and carbon paper of cellulosic origin.

In the present Examples, perfluorocarbonsulfonic acid resin was used as the polymer electrolyte, but the present invention can be applied to such cation exchange resins in general as perfluorocarboncarboxylic acid resin, styrene-divinylbenzenesulfonic acid resin and styrene-butadienesulfonic acid resin.

As set forth above, according to the present invention, the water-retaining property of the inside of the MEA is improved without hindering gas diffusion and the polymer electrolyte is moistened by the water formed at the positive electrode, whereby an electrode for PEFC and a PEFC which are suited to operation by unhumidified gas can be obtained.

What is claimed is:

1. A process for moistening a polymer electrolyte membrane of a polymer electrolyte fuel cell, said fuel cell comprising (i) a polymer electrolyte membrane and (ii) arranged on opposing sides of said membrane, a positive electrode and a negative electrode each comprising a catalyst layer and a gas diffusion layer, said gas diffusion layer of at least one of the positive electrode and the negative electrode comprising an electroconductive porous material comprising a fluororesin in an amount of from 16–55% by weight, said process comprising:

(a) feeding unhumidified air or oxygen to said positive electrode;

(b) feeding unhumidified hydrogen or reformed gas containing hydrogen to said negative electrode;

(c) carrying out reaction (1) at said positive electrode:

$$\tfrac{1}{2}O_2 + 2H^+ + 2e^- \rightarrow H_2O \qquad (1)$$

and carrying out reaction (2) at said negative electrode:

$$H_2 \rightarrow 2H^+ + 2e^- \qquad (2)$$

so as to moisten said membrane with the water formed at said positive electrode.

2. The process for moistening a polymer electrolyte membrane of a polymer electrolyte fuel cell according to claim 1, wherein said gas diffusion layer has a porosity of from 45–75%.

3. The process for moistening a polymer electrolyte membrane of a polymer electrolyte fuel cell according to claim 1, wherein said gas diffusion layer has a specific volume of pores having a diameter of 17–90 μm of from 0.45–1.25 cm²/g.

4. The process for moistening a polymer electrolyte membrane of a polymer electrolyte fuel cell according to claim 1, wherein said fluororesin is a copolymer of tetrafluoroethylene and hexafluoropropylene.

5. The process for moistening a polymer electrolyte membrane of a polymer electrolyte fuel cell according to claim 1, wherein said electroconductive porous material is carbon paper comprising carbon fiber comprising polyacrylonitrile.

6. The process for moistening a polymer electrolyte membrane of a polymer electrolyte fuel cell according to claim 1, wherein at least one of said positive electrode and said negative electrode is prepared by a process comprising the steps of:

(a) dispersing carbon powder supporting a noble metal catalyst in an organic solvent to obtain a liquid dispersion;

(b) mixing said liquid dispersion with an alcoholic solution of a polymer electrolyte to simultaneously form a polymer electrolyte colloid and obtain a liquid mixture wherein the colloid has been adsorbed to the carbon powder; and (c) applying said liquid mixture on one side of the gas diffusion layer.

* * * * *